United States Patent [19]

Andric

[11] Patent Number: 4,709,504
[45] Date of Patent: Dec. 1, 1987

[54] PORTABLE DISPOSABLE INSECT TRAP

[76] Inventor: Milos D. Andric, 1635 Central Ave., Wilmette, Ill. 60091

[21] Appl. No.: 843,137
[22] Filed: Mar. 24, 1986
[51] Int. Cl.$^4$ .............................................. A01M 1/14
[52] U.S. Cl. ........................................ 43/114; 43/121
[58] Field of Search .............. 43/107, 114, 121, 132.1, 43/108

[56] References Cited

U.S. PATENT DOCUMENTS

| | | | |
|---|---|---|---|
| 2,593,781 | 4/1952 | Meis | 43/108 |
| 3,913,259 | 10/1975 | Nishimura | 43/121 |
| 4,031,654 | 6/1977 | Gray | 43/114 |
| 4,048,747 | 9/1977 | Shanahan | 43/114 |
| 4,214,400 | 7/1980 | Patmore | 43/121 |
| 4,217,722 | 8/1980 | McMullen | 43/114 |
| 4,244,134 | 1/1981 | Otterson | 43/114 |
| 4,566,219 | 1/1986 | Firth | 43/132.1 |

Primary Examiner—Kurt Rowan
Attorney, Agent, or Firm—Richard G. Kinney

[57] ABSTRACT

Several embodiments of disposable crawling insect traps are disclosed, each of which is made of moderately flexible pasteboard or other inexpensive material, formed in an elongated, narrow, slim, flat continuous strip, and sized to easily lay or be releasably secured across or adjacent to a room's thresholds, window sills, exhaust grills, ducts, corridors, stairs, cabinet bases, and other points of entry or exit by crawling insects. The traps contain an interior surface partially covered with a tacky glue-like substance for ensnarling the insects, or, alternatively, that surface may contain insect poison. In several embodiments, a "roof" layer of thin material is supported over the interior layer of glue or poison, so as to provide ease in handling and an attractive (to insects), narrow, elongated slit running along one long edge or side of the strip. In several embodiments, marginal portions of the base are bent backward at a small angle to the internal "floor" of the strip, so as to both protect the human user from hand contact with the glue or poison and also to aid in entrapping the insect in the trap.

6 Claims, 15 Drawing Figures

PORTABLE DISPOSABLE INSECT TRAP

FIELD OF THE INVENTION

The present invention is directed to a new and improved portable disposable insect trap and method of making and using the trap.

BACKGROUND OF THE INVENTION

Crawling insects such as roaches and ants have been a pest to mankind throughout and before written history. Despite the best efforts of Egyptian curses and modern science and technology, these insects still "bug" us.

Modern man has not neglected this field by any means. See, for example, U.S. Pat. Nos. 1,566,199; 2,328,590; 2,328,591; 2,340,255; 2,340,256; 3,704,539; 3,864,867; 4,044,495; 4,048,747; 4,395,842; and, 4,400,905.

Such sticky-glue type roach traps as described in the aforementioned U.S. Pat. Nos. 4,395,842; 4,048,747; and 2,340,256, while serving to capture insects, suffer from the drawback that the insect must by chance approach and enter a centrally-located, small trap.

Other drawbacks of prior art traps and anti-insect devices are that they do not readily adapt themselves to economical and easy construction or are too costly for widespread use.

SUMMARY OF THE INVENTION

In overcoming one or more of the drawbacks of the prior art, a package of a plurality of disposable insect traps is provided, each of which is elongated, of the length of 30 inches or more, by two inches or so wide, and are capable of being edge-abutted to form a continuous line of defense against crawling insects, each of such traps being designed to contain or comes containing material such as sticky glue, poison, borax powder, or like anti-insect material along its length, on an upwardly-opening surface, formed so as to be stackable, with the surfaces separated from and not to contact the adjacent trap. And, the package of traps is formed with said plurality of traps stacked one atop each other, and the stack is enclosed by a close-fitting, flexible packaging material.

The traps may be economically and continuously manufactured by forming a continuous flowing strip of elongated material, forming it into the trap shape in cross section, applying the anti-insect material to the elongated material, and cutting it into the desired lengths, stacking groups of the successive cut-off lengths, one atop each other, and wrapping the groups.

In accordance with one feature of the invention, the trap is made with a continuous roof covering the anti-insect material area, which roof is held over the area by means of spaced-apart transverse walls attached to the roof and secured to the floor, forming part of the trap.

The invention, together with the advantages thereof, may best be understood by reference to the following description taken in connection with the accompanying drawings, in the several figures of which, like reference numerals identify like elements.

DETAILED DESCRIPTION OF PREFERRED EMBODIMENTS

Figures 1, 2:
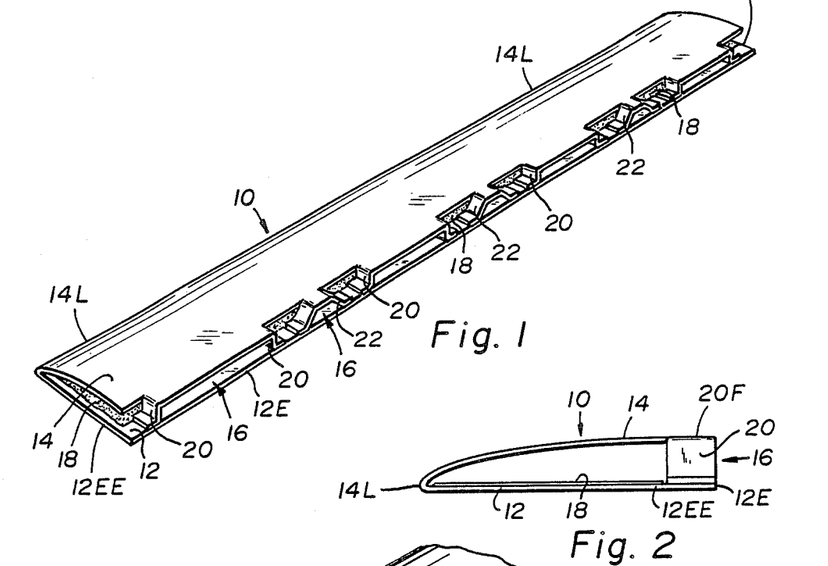
FIG. 1 is a perspective view of a disposable portable insect trap constructed in accordance with the present invention.
FIG. 2 is a side view of the trap of FIG. 1.

Referring now to FIG. 1, there is depicted an insect trap constructed in accordance with the present invention and which is generally designated 10. The trap 10 is an elongated strip, which is sized to the crawling insects it is designed to attract. For most of the United States, for ordinary roaches, silverfish, ants, earwigs and the like, it is of the order of thirty or more inches in length (preferably about 36 inches—to fit common widest size door passage) and with a width of the order of two to four inches. The trap 10 has a floor 12 and roof 14, separated for most of the transverse width of the trap by a small distance, to provide a narrow slit-like opening 16 into which the insect may crawl. The roof 14 is preferably made of a relatively opaque but economical material such as cardboard or pasteboard, so as to provide a dark interior. Such a dark slit opening 16 is believed to be attractive to crawling insects. The height of the opening 16 is sized to the insects desired to be attracted and, for most parts of the United States, is preferably about 3/16 inch for the insects commonly encountered. The material of the roof 14 and floor 12 may be 20 mills. thick pasteboard or 20 mills. thick PVC.

The interior upper surface of the floor 12 has a coat 18 of anti-insect material, such as tacky glue such that sold under the trademark "Trap-Stik" by Southern Mill Creek Products Company, of Tampa, Fla., and Cleveland, Ohio. This anti-insect material 18 is applied in a continuous strip down the length of the trap 10 on the floor 12 but is confined to an area set back from the lengthwise edge 12E of the floor 12 and also from the end edges 12EE of the floor 12. The outside surfaces of the floor 12 and roof 14, their edges, and a marginal set-back area of the interior surface of the floor 12 are free of the anti-insect material 18, making the trap 10 easy and safe to be handled and used.

The roof 14 is formed by folding over a single piece of semi-rigid material, such as cardboard, along a longitudinal line 14L, as best seen in FIG. 2. The roof 14 is preferably arched upward from line 14L to parallel the floor at the opening 16 and is secured in place and in this arched shape by means of short tab-like vertical walls 20 and ramps 22. As better shown in FIG. 3, these walls 20 are formed by slitting the material of the roof and bending it down along fold line 20F and folding it again along crease line 20C, to provide a foot or pad 20P which is secured by adhesive (or, when the trap 10 is of plastic, by solvent or heat welding) or other suitable means to the floor 12.

Figure 3:
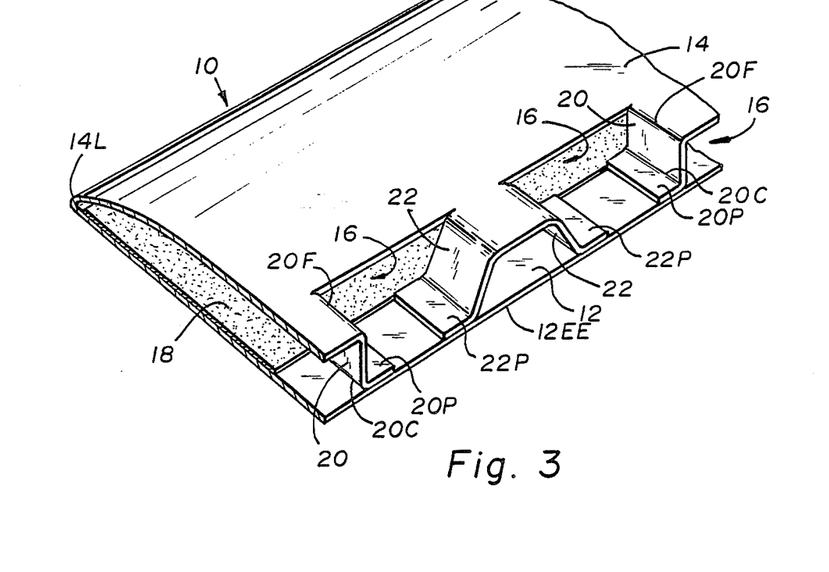
FIG. 3 is a partial detail perspective view (partly in section) of a portion of the trap of FIGS. 1 and 2.

The ramps 22 are formed similarly and have their bottom marginal section 22P similarly affixed to the floor 12. The ramps 22 are provided to accommodate smaller insects which may travel from the fold 14L side of the trap 10 over to the slit 16 side of the trap. Once down the ramp, they will likely be attracted into the slits 16 and onto the anti-insect material 18.

Figure 4:
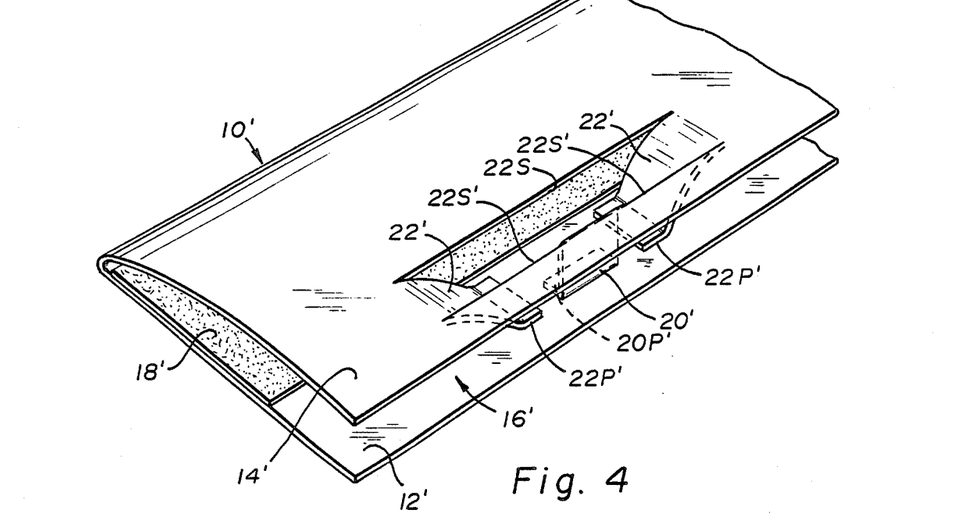
FIG. 4 is a detailed partial perspective view of a modified second embodiment of the invention.
Figure 5:
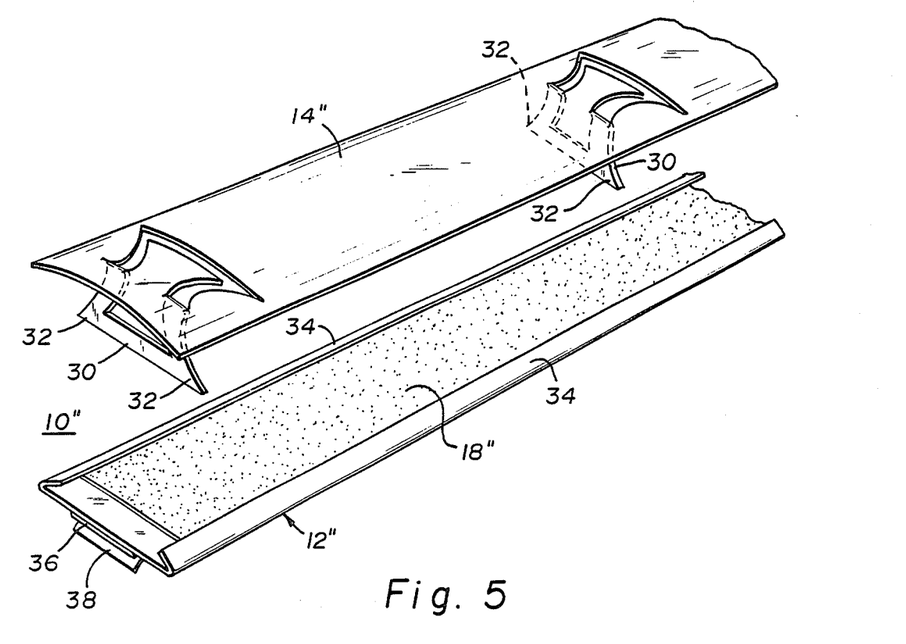
FIG. 5 is a perspective exploded view of another embodiment of the invention.
Figure 6:
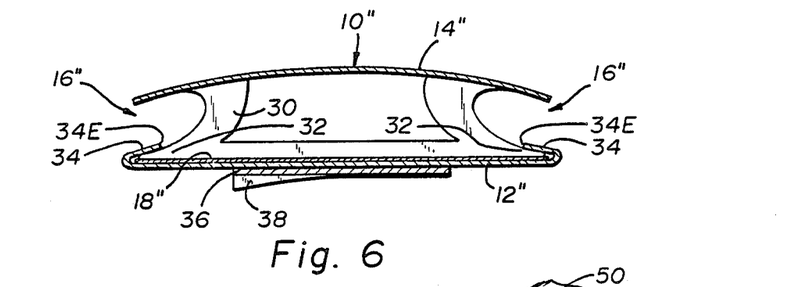
FIG. 6 is a sectional view of the assembled trap of FIG. 5.

Referring to FIG. 4, an alternative trap construction 10' is there depicted. In this case, the ramps 22' are formed by two longitudinal slits 22S and 22S', and a longitudinal wall 20', is formed by two transverse slits (the same ones that form the ends of the ramps 22) and a portion of the slit 22S. The feet 22P' and 20P' of the ramps 22' and wall 20' are formed and adhered to the floor 12'. This construction provides a continuous slit opening 16', without edge cuts which might be stressed and torn during handling. In FIGS. 5 and 6, a third embodiment 10" of the invention is depicted, one that has its roof 14" formed separately from that of its base 12". In this case, two slits 16" are formed, one along each longitudinal edge of the trap 10". The roof 14" is held up and secured in place by means of a cut-out and folded-down transverse wall 30 that has projecting outer bottom points 32 sized and shaped to fit under a folded-back and over longitudinal margins 34 of the base 12". As best shown in FIG. 6, the margins 34 serve as reverse entrance ramps for the insect, at about the same slope as the edges of the roof 14". That is, once the insect passes over a margin 34 into the anti-insect material 18", it is difficult to leave, as it must climb up from the coating 18''' to the edge 34E of the margin 34.

The trap 10" also is provided with a strip 36 of double-sided adhesive tape (or double-sided foam) covered by a release paper 38. Such double-sided adhesives are well known and commercially available in many degrees of adhesive power. As the trap 20", and indeed all of the traps here depicted, are lightweight, only a light adhesive need be used, and, as the traps are disposable, the adhesive should be one that easily and completely releases when the trap is removed. For example, the tape sold under the Scotch trademark as model no. 666 by 3M Corporation (or no. 656) is such a tape.

While normally the traps 10, 10', or 10" may be used by simply laying them across a threshold or on the floor or rug, there are some occasions when it may be desirable to secure them to a vertical surface or underneath a horizontal surface. For these occasional uses, the traps 10, 10' or 10" (or the traps to be described below) may be provided with such tape 36 and release paper 38.

Figure 7:
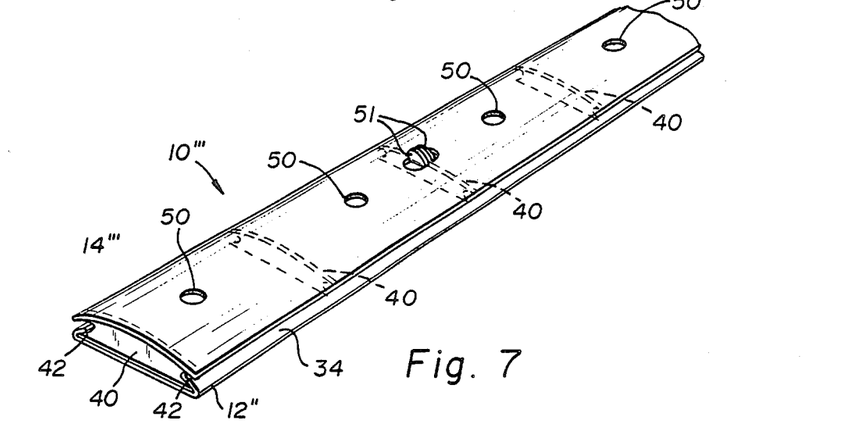
FIG. 7 is a perspective view of an alternative embodiment similar to that of FIGS. 5 and 6.

Referring to FIG. 7, another embodiment 10''' of the present invention is there depicted. This embodiment employs a base 12" identical to that of the prior embodiment but employs separate wall members 40 and a roof 14''' that is secured to the walls 40 in the same manner as is the base 12". That is, by inward folded margins 42 that overlap the pointed top outer portions of the walls 40. A series of small access holes 50 are provided, one for each compartment, formed by the walls 40.

This embodiment 10''' is especially adapted for use with liquid or loose powder anti-insect materials 18, in that the access holes (preferably sized to closely receive the dispenser for the liquid or powder) allow a charge to be placed in each compartment formed by the walls 40. Thus, for example, when using the trap against ants, liquid ant poisons may be applied through tabs 50 into the base 12" and periodically reapplied. The base 12', walls 40, and close-fitting cover 14''' prevent the liquid so deposited from easily being reached by pets or children and provides added safety against misuse. The bottoms of walls 40 at both ends of the trap 10" are preferably sealed to the base 12"', so as to prevent leakage. The roof 14''' also has a pair of semicircular cutouts 51 which are bent upward to provide a finger grip. Two such sets are preferably provided in each length of trap 10''', so that the trap may be picked up and carried by the roof.

Figure 8:
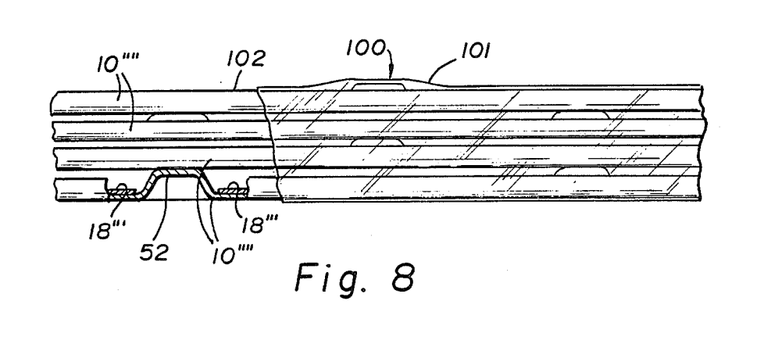
FIG. 8 is a side view, partly in section, of a package of a stack of traps constructed in accordance with the present invention and constituting yet another embodiment of the present invention.

In FIG. 8, there is depicted a package 100 of traps 10'''', each of which may be made as was the base 12" but without a roof. In this embodiment, longitudinally-spaced upraised portions 52 are provided to prevent the anti-insect material 18''' from touching the bottoms of a similar trap 10''' stacked atop it. A set of four or more such traps 10''' are preferably so stacked and covered by an enveloping plastic or cellophane cover 101. A shrink-wrap plastic sheeting may be advantageously employed. Such a sheet would stretch taut across and between the top edges 102 of the uppermost trap 10'''' and so also not contact its layer 18'''. Thus, the coatings 18'''' would be entirely free from contact with either the packaging or the adjacent trap's outer surfaces.

Figure 9:
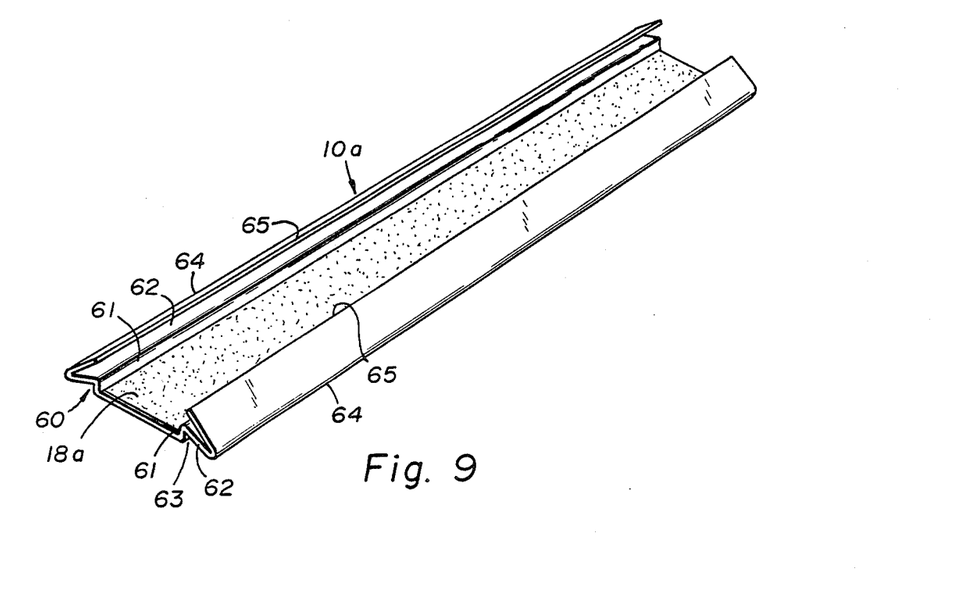
FIG. 9 is a perspective view of another embodiment of the invention.
Figure 10:
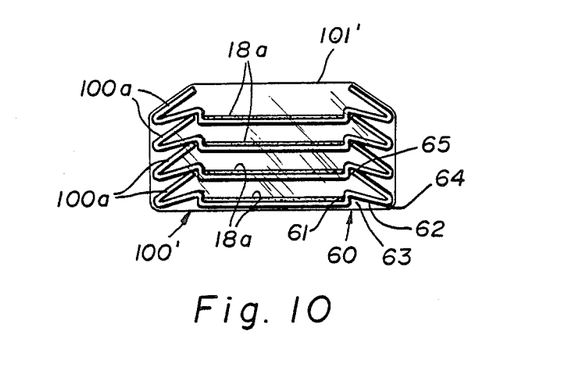
FIG. 10 is a side view of a package of four of the trap shown in FIG. 9.

FIGS. 9 and 10 depict another trap 10a and package 100' which are likewise stackable and wrappable, without danger of contamination by or of the coating 18a. The sticking feature is achieved by means of the raised longitudinal margins 60 being first raised upward to form a lip 61 to contain the material 18a and thereafter bent outward and downward for a section 62. The underside of the lip 61 and section 62 form a longitudinal downward-facing groove 63. The marginal portion is bent back from the end of the section 62, to project upwardly and inwardly and form a longitudinal outer ridge or corner 64, and to terminate at a longitudinally-extending edge 65, which, when the traps 100a are stacked, is seated into the grooves 63 as shown in FIG. 10.

The height of the edge 65 is such that it neatly separates the material 18a from the bottom of a stacked-above trap 100a. Again, a tight-fitting plastic or like sheet envelope 101' encloses and holds together and protects the stack of traps 100a.

Two or more of the traps 100a may have their ends snapped together in the manner of gutter sections to provide a longer run of strip trap. Thus, the four depicted traps of FIG. 10, if each of the preferred 36-inch length, would provide a continuous length of nearly 12 feet of continuous strip trap.

The traps 10a are preferably made out of extruded thin-walled plastic, such as PVC, cut into 36-inch lengths, with sticky glue applied to the area between the lips 61. A plastic thickness of 10 to 20 mills. is considered adequate, with an overall width of 2 inches and a height of about ¼ inch.

Figure 11:
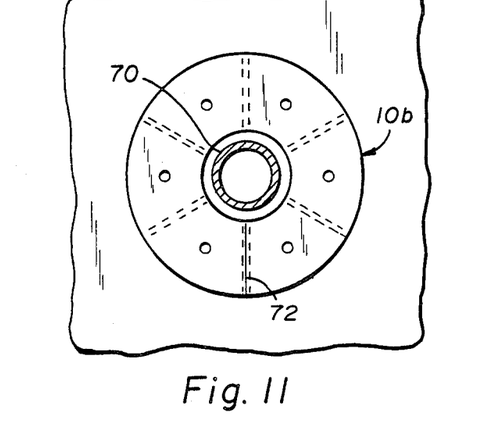
FIG. 11 is a plane view, partly in section, of an alternative embodiment of the trap of the present invention.
Figures 12, 13:
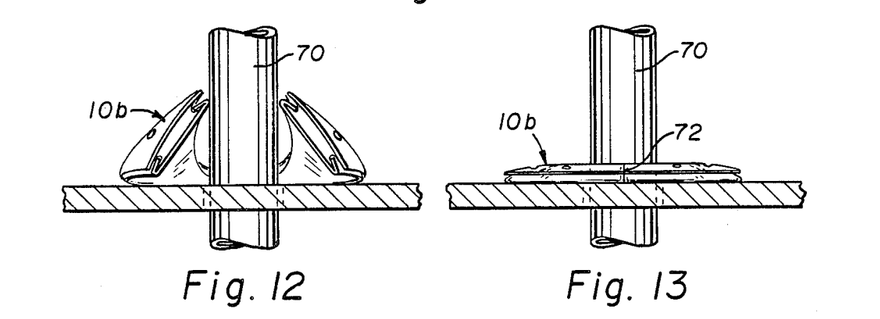
FIG. 12 is an elevational view of the trap of FIG. 11, illustrating how it is installed about a pipe or like object.
FIG. 13 is a side view, partly in section, of the installed trap of FIGS. 11 and 12.

While straight lengths of trap are preferred because of their nearly universal usefulness and because of their ease of manufacture, there are some applications wherein a round shape is preferred. For example, as around a pipe, such as the pipe 70 shown in FIGS. 11-13. The present invention may be adapted to provide a curved or round strip trap for encircling such a pipe, and one such trap constructed in accordance with the present invention and generally designated 10b is depicted in FIGS. 11-13.

The trap 10b is essentially the trap 10''' of FIG. 7, curved in a horizontal plane back upon itself, with its ends 72 abutting each other when relaxed. The trap 10b being made of semi-flexible material may be bent upward as shown in FIG. 12, so as to clear the pipe 70 and relax into the shape of FIGS. 11 and 13.

Although shown for particularity as a variation of the trap 10''', any of the strip embodiments shown may be similarly formed into encircling or curving strip traps.

Figure 14:
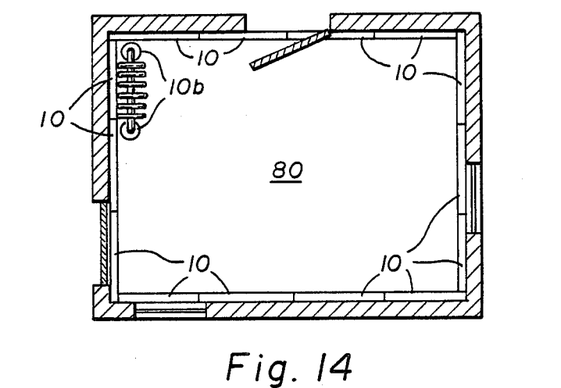
FIG. 14 is a plane view of a building and room, illustrating how the traps of the preceding figure may be used.

The method of use of the traps of this invention is illustrated by FIG. 14, wherein a periphery defense of endtraps is laid down about a room 80. The traps of the present invention being made of lightweight material may be overlapped or cut to size. Because of their inexpensive nature (being made of cardboard or thin plastic and being easily assembled and manufactured), the user may lay down a periphery defense such as shown in FIG. 14 during periods of absence and return to take them up (and stack for storage or discard them). For example, the user of a week-end cottage may lay down a perimeter of traps such as shown in FIG. 14 when he departs for the week and take it up for discarding when he next returns (or, if unused, for storage and replacing when he leaves after the weekend).

Figure 15:
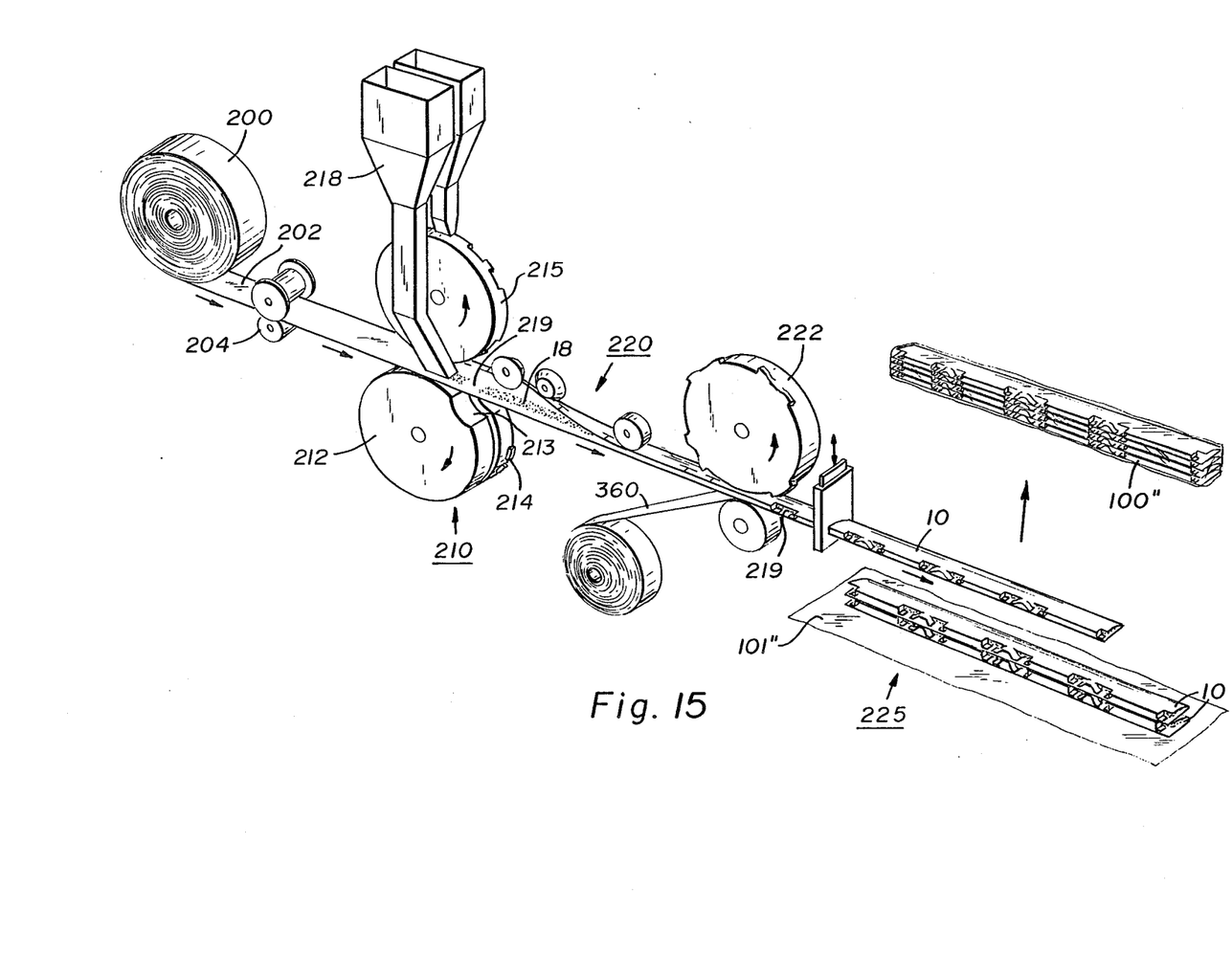
FIG. 15 is a schematic, partly in perspective, view, illustrating the method of and apparatus used in manufacturing and packaging the trap of FIGS. 1-3.

As mentioned above, the traps of this invention are also easy to make and economical to use. In FIG. 15, a process and apparatus for manufacturing traps such as the trap 10 of FIGS. 1-3 is depicted. The traps 10 are made from a roll 200 of thin pasteboard which is fed out in a strip 202 through rollers 204 and through a die-cutting, material 18 applying and tab adhesive-applying stage 210. This preferably includes a pair of wheels or rollers sized to have a circumference equal to the desired length of the finished strip trap 10, for example, 36 inches. The bottom wheel 212 has a gap or depression 213 which causes the strip 202 to be lowered whenever that gap turns under it.

A material 18 applier mechanism 218 is provided above the wheel 212, to meter the material 18 (for example, tacky glue) onto the top of the strip 202. Whenever the gap 213 turns under the strip 202, it lowers the strip momentarily out of contact with the applicator 218, to form a short gap 219 in the strip of glue 18 otherwise laid down.

Adjacent to the wheel 212 is a die wheel 214 having upstanding sharp edges for forming spaced-apart sets of cuts or slits into the far-marginal areas of the strip 202. An anvil wheel 215 is provided, into which the raised dies of the wheel 214 may bear against and which aids in the cutting process. The wheel 215 also serves to apply adhesive to selected spots on the cut tabs. Both wheels 214 and 215 have circumferences sized to the length of the trap 10 (e.g., 36 inches) and have the dies so arranged so as to lay down a series of tab cuts corresponding to the walls 20 and ramps 22 shown in FIG. 1. As the wheel 210 turns coincidentally with the wheel 214, the gap-making depression 213 is aligned, so as to provide a gap 219 in the glue 18 corresponding to the position between the die cuts for edge end walls 20.

The die-cut and material 18 bearing strip 202 leaves the station 210 and travels to a folding station 220, wherein it is creased to form fold 14L and then under a tab clamp wheel 222 (equal in size to the wheels 212, 214, 215, and run coincidentally therewith, e.g., by being chain-driven in common with them). This wheel 222 folds down the tabs to form the wall 20 and ramp 22 shown in FIGS. 1 and 3 and presses the adhesive-bearing portions (feet 20P, 22P) against the marginal edge of the strip to secure them in place.

At this station, the bottom layer of double-stick tape 360 (such as the tape 36 and release paper 38 of FIGS. 5 and 6) may be applied to the bottom of the folded-over strip.

Next, the moving strip, now formed into a continuous trap 10, is sliced or cut by a bias-moving knife into desired lengths, which are stacked at station 225 and wrapped with a cover 101'' into a package 100''.

It should now be appreciated that the package 100'' of the traps 10 may be created continously, using only a few inexpensive parts and little or no expensive labor.

The other elongated embodiments may also be easily adapted to manufacture in a similar manner, vacuum hot plastic forming.

It should also be appreciated that the traps of the present invention may be used to provide a periphery defense or to virtually assure that a room or house can be made crawling insect-free and remain that way.

While several embodiments of the invention have been shown and described, it will be obvious to those skilled in the art that changes and modifications may be made without departing from the invention, and, therefore, the aim in the appended claims is to cover all such changes and modifications as fall within the true spirit and scope of the invention.

I claim:

1. A disposable crawling insect trap, comprising, in combination:
    an elongated strip housing made of a unitary piece of thin, flat-sheet foldable material, having a length many times its width, said piece being folded back along its length, so as to form a roof and overlay a floor portion of itself and being provided with a number of at least three tabs cut in its surface at spaced intervals along its length, said tabs being folded inward so as to provide a plurality of spaced walls to maintain the longitudinal edges of the folded piece spaced apart a short vertical distance so as to form a substantially continuous narrow longitudinal side slit opening of a height sized to allow insects to enter into the housing between the longitudinal edges of the piece,
    anti-insect material provided within the housing and extending substantially along its entire length but set back from said slit-opening so as to not readily contact the hands of a human using the trap nor other articles outside the trap; and
    wherein said material is one of a group of pasteboard or heavy paper or plastic, and said tabs are cut from the upper folded-over roof portion of the roof-forming piece and bent downward to contact said floor portion.

2. The trap of claim 1, wherein said material is pasteboard, said roof is arched, and the downward portions of said tabs are secured to the floor portion of the housing.

3. The trap of claim 2, wherein at least some of said tabs are cut so as to form transverse walls.

4. The trap of claim 3, wherein some of said tabs are folded down at an angle to form a ramp between the roof and the floor portions of the housing.

5. The trap of claim 1 wherein said material is heavy paper, and at least some of said tabs are cut from the horizontal edge of the roof portion and folded down to form transverse oriented walls.

6. The invention of claim 1, wherein the housing is approximately 36 inches by 2 inches wide and ¼ inch high, and said anti-insect material is tacky glue spread in a continuous layer on the interior floor along substantially the entire length of the housing.

* * * * *